UNITED STATES PATENT OFFICE.

HERMANN BENING, OF NEW YORK, N. Y., ASSIGNOR TO HIMSELF AND CHESTER A. WELLER, OF SAME PLACE.

COMPOUND FOR THE MANUFACTURE OF ARTIFICIAL STONE.

SPECIFICATION forming part of Letters Patent No. 300,560, dated June 17, 1884.

Application filed October 12, 1883. (No specimens.)

*To all whom it may concern:*

Be it known that I, HERMANN BENING, of the city, county, and State of New York, have invented a new and useful Improvement in Compounds for the Manufacture of Artificial Stone, of which the following is a full, clear, and exact description.

My compound consists of the following ingredients, combined in the proportions stated, viz: sand, fifty pounds; Rosedale or Portland cement, fifty pounds; oxalic acid, one pound; chalk, one pound; commercial muriatic acid, one quart; iron filings, one-half pound, and water.

In preparing my improved compound, the iron filings and muriatic acid are placed in an iron vessel and allowed to stand until the chemical action has ceased. Water is then added to the solution in the proportion of sixteen gallons of water to one gallon of the solution. The sand, cement, oxalic acid, and chalk are then mixed with so much of the diluted solution as will form a plastic mass, which is then molded or otherwise formed into any desired shape.

Having thus described my invention, I claim as new and desire to secure by Letters Patent—

The herein-described compound for the manufacture of artificial stone, consisting of sand, cement, oxalic acid, chalk, muriatic acid, iron filings, and water, in the proportions specified.

HERMANN BENING.

Witnesses:
JAMES T. GRAHAM,
C. SEDGWICK.